United States Patent
Wilkas et al.

(10) Patent No.: US 11,241,800 B2
(45) Date of Patent: Feb. 8, 2022

(54) ASYMMETRIC DUAL END EFFECTOR ROBOT ARM

(71) Applicant: Persimmon Technologies Corporation, Wakefield, MA (US)

(72) Inventors: Scott Wilkas, Lexington, MA (US); Martin Hosek, Lowell, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 157 days.

(21) Appl. No.: 16/815,545

(22) Filed: Mar. 11, 2020

(65) Prior Publication Data
US 2020/0290211 A1 Sep. 17, 2020

Related U.S. Application Data

(60) Provisional application No. 62/816,413, filed on Mar. 11, 2019.

(51) Int. Cl.
| | | |
|---|---|---|
| *B25J 9/04* | (2006.01) | |
| *B25J 11/00* | (2006.01) | |
| *B25J 9/10* | (2006.01) | |
| *B25J 9/02* | (2006.01) | |
| *B25J 9/00* | (2006.01) | |

(52) U.S. Cl.
CPC .......... *B25J 11/0095* (2013.01); *B25J 9/0087* (2013.01); *B25J 9/02* (2013.01); *B25J 9/105* (2013.01)

(58) Field of Classification Search
CPC ... B25J 9/0087; B25J 9/02; B25J 9/042; B25J 9/105; B25J 11/0095
See application file for complete search history.

(56) References Cited

U.S. PATENT DOCUMENTS

| | | |
|---|---|---|
| 9,149,936 B2 | 10/2015 | Hosek et al. |
| 2001/0036398 A1 | 11/2001 | Hofmeister |
| 2005/0118010 A1 | 6/2005 | Ogawa et al. |
| 2007/0020082 A1 | 1/2007 | Caveney et al. |
| 2008/0124206 A1 | 5/2008 | Choi et al. |
| 2008/0298945 A1 * | 12/2008 | Cox .................. H01L 21/67742 414/744.7 |
| 2010/0178147 A1 | 7/2010 | Kremerman et al. |
| 2014/0150592 A1 | 6/2014 | Kremerman |
| 2014/0154033 A1 | 6/2014 | Blank et al. |
| 2014/0205416 A1 * | 7/2014 | Hosek ..................... B25J 9/105 414/744.6 |

(Continued)

OTHER PUBLICATIONS

Hosek, Martin, et al. "Material-Handling Robot With Multiple End-Effectors", U.S. Appl. No. 15/897,374, filed Oct. 6, 2015, 101 pages.

*Primary Examiner* — Dale Moyer
(74) *Attorney, Agent, or Firm* — Harrington & Smith

(57) ABSTRACT

An apparatus includes a first arm comprising an unequal-link linkage having a first end effector; a second arm comprising an equal-link linkage having a second end effector; and a drive unit coupled to the first arm and the second arm, the drive unit being configured to move the first arm and the second arm. The first end effector is asymmetric to the second end effector. The first end effector is angled relative to the second end effector such that a first substrate support section on the first end effector is not positioned over or under a second substrate support section on the second end effector.

21 Claims, 15 Drawing Sheets

(56) References Cited

U.S. PATENT DOCUMENTS

2017/0028546 A1 2/2017 Wilkas et al.
2017/0368680 A1* 12/2017 Muthukamatchi .......................... H01L 21/67742
2018/0233397 A1 8/2018 Hosek et al.

* cited by examiner

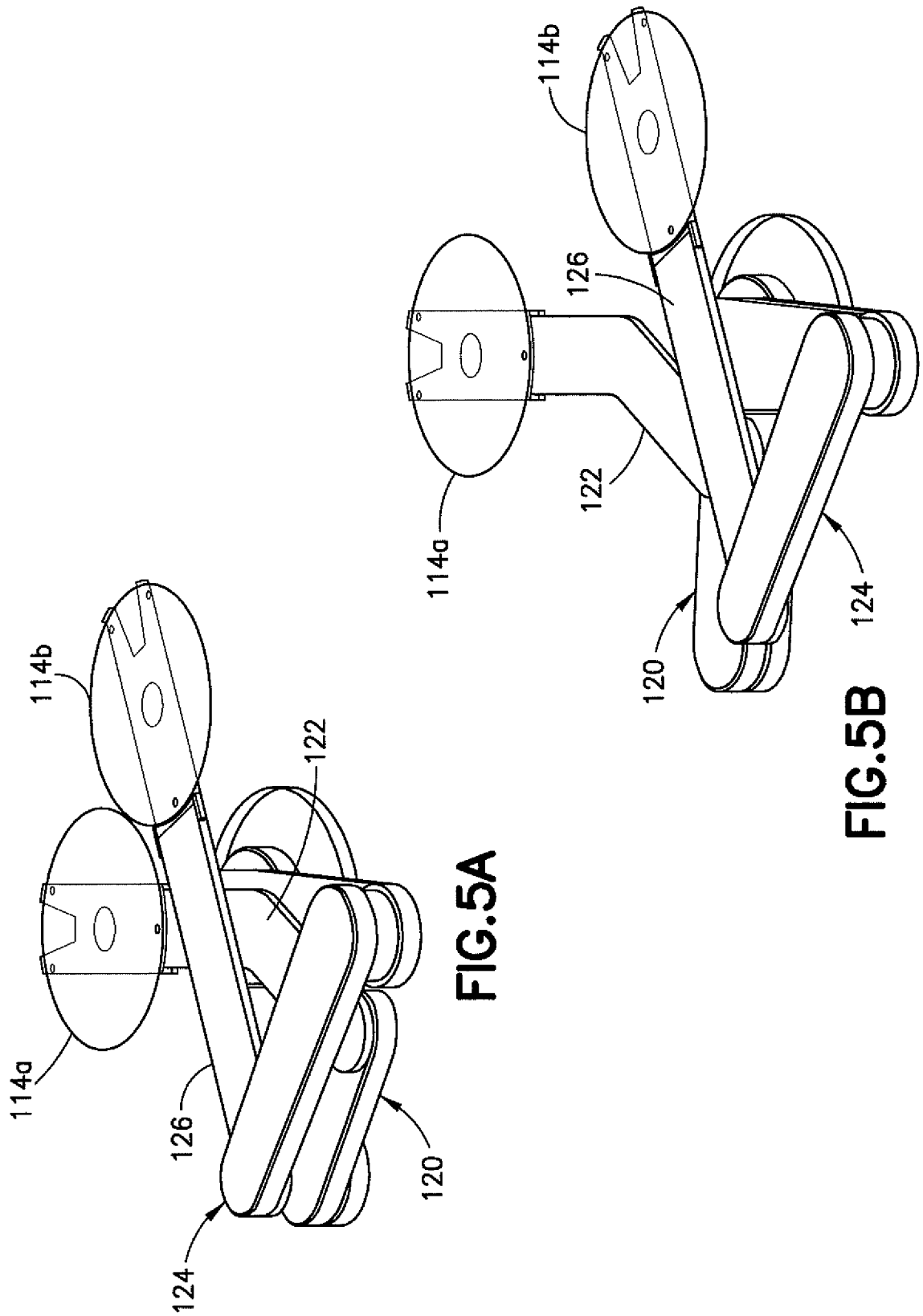

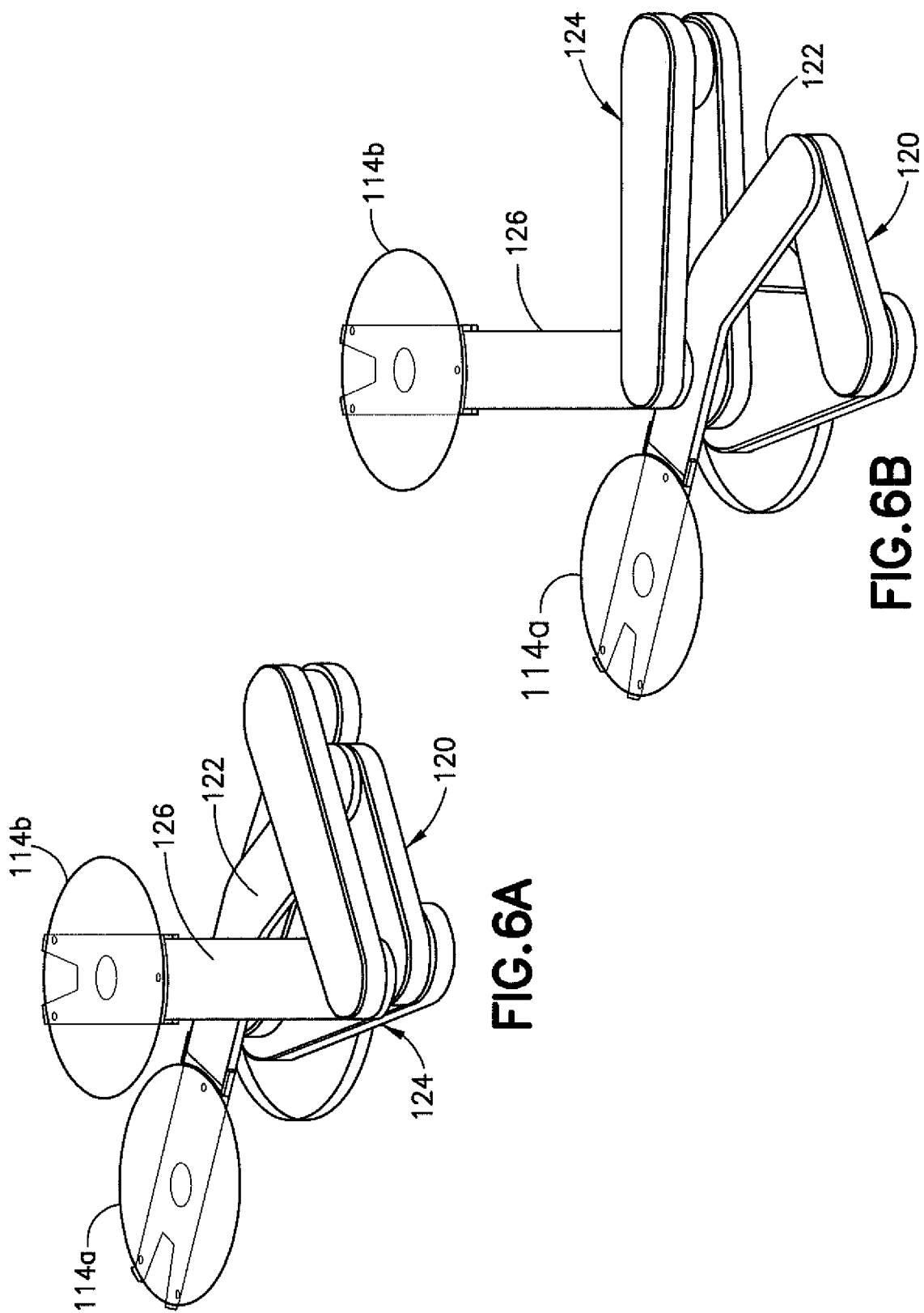

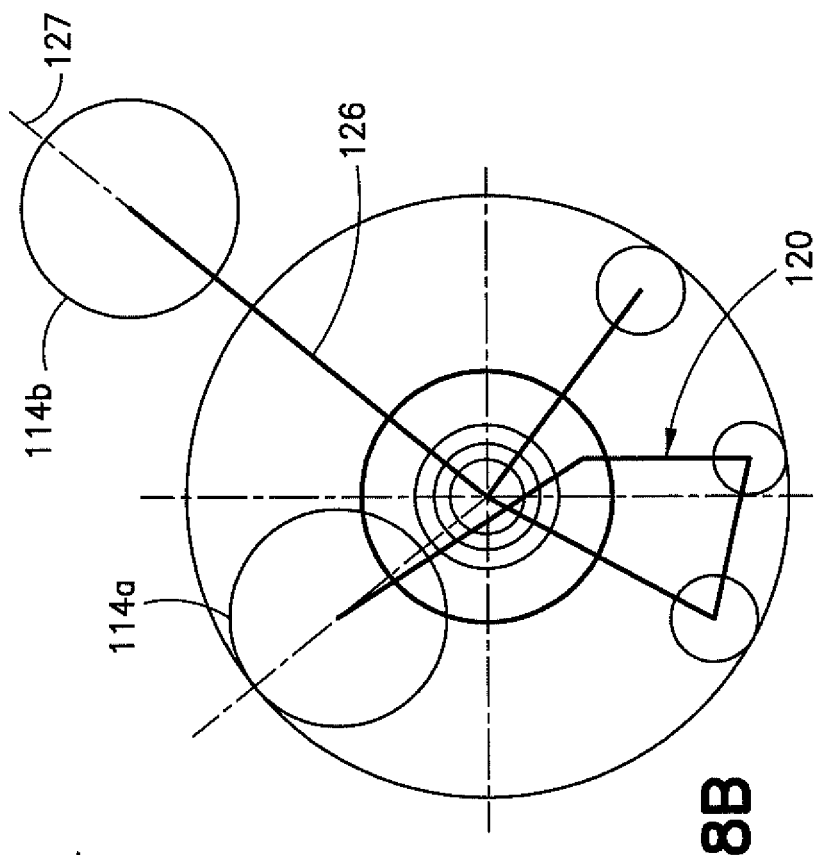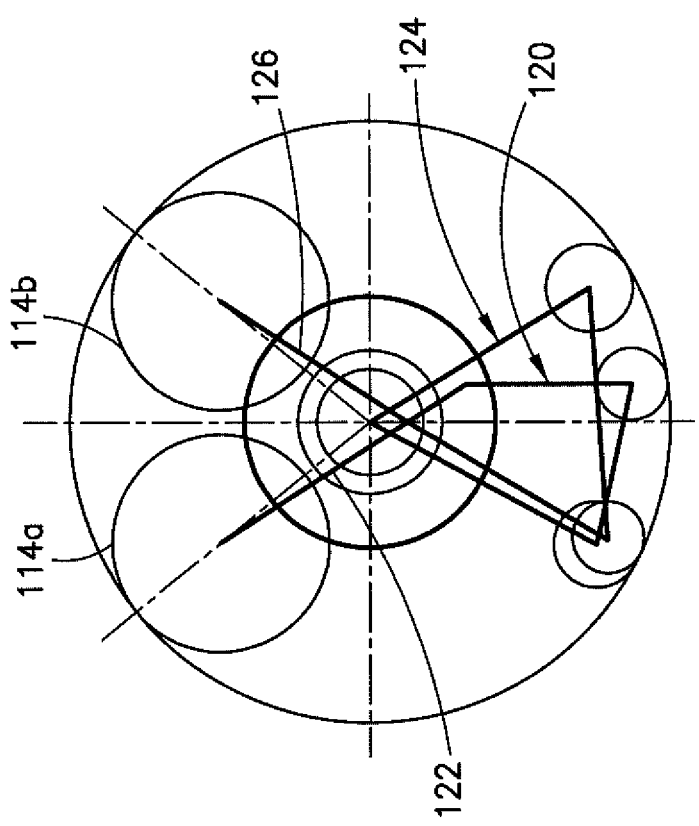

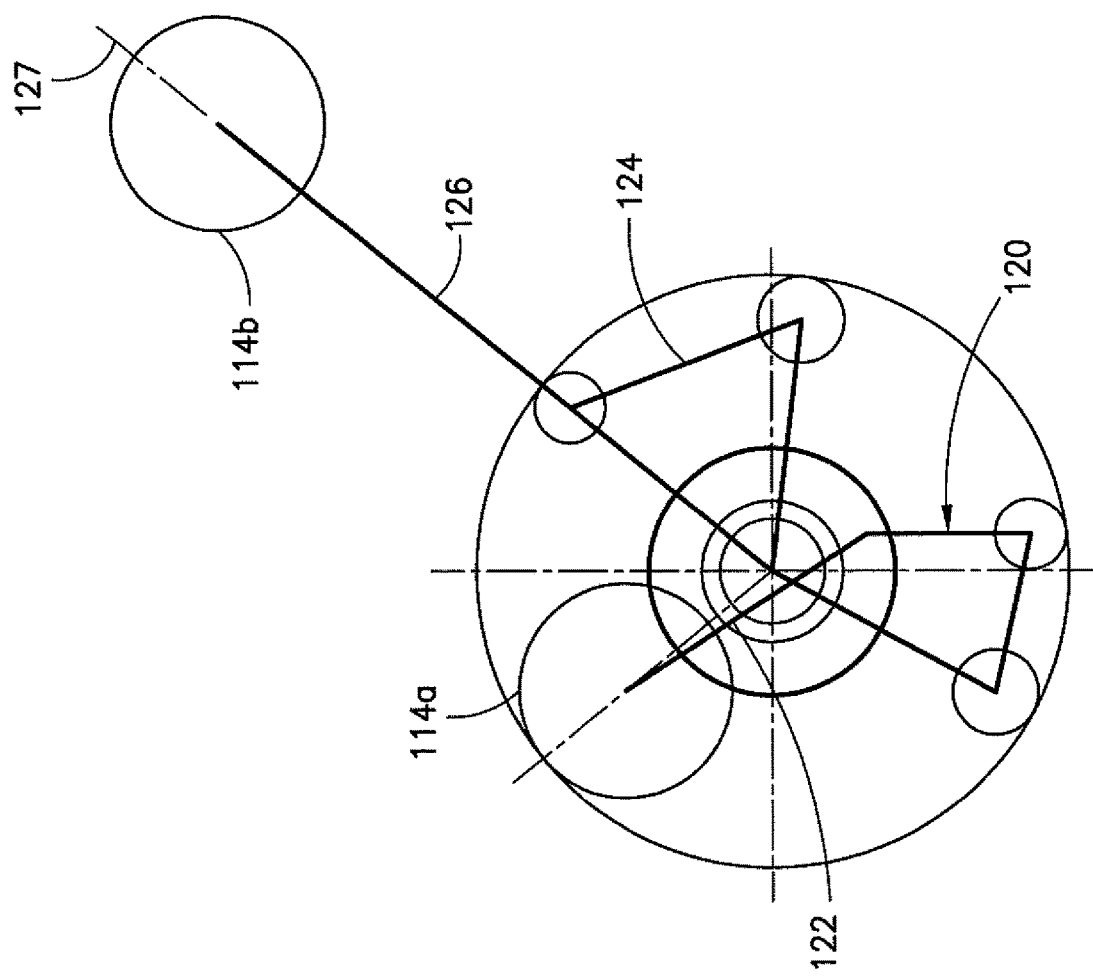

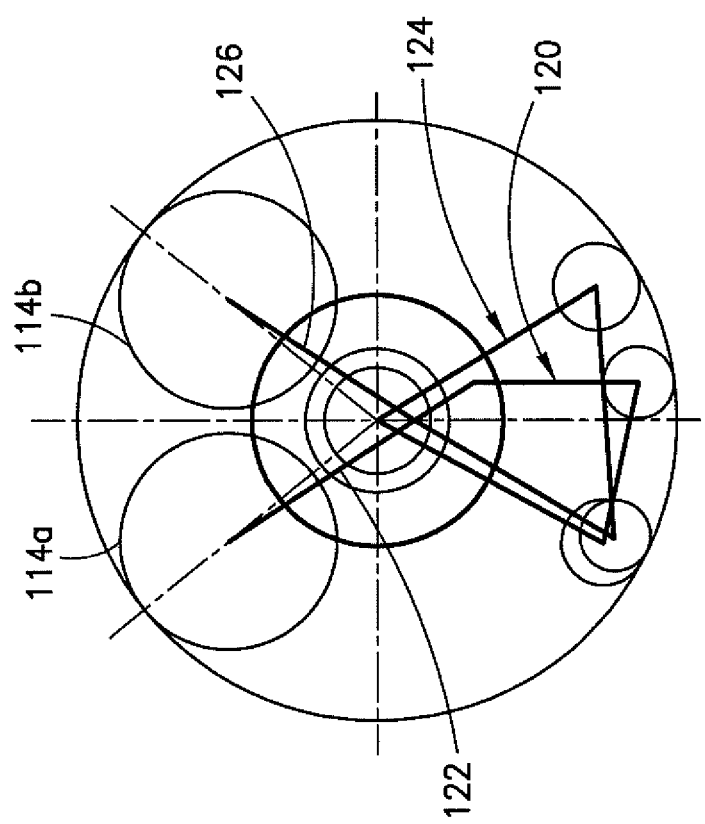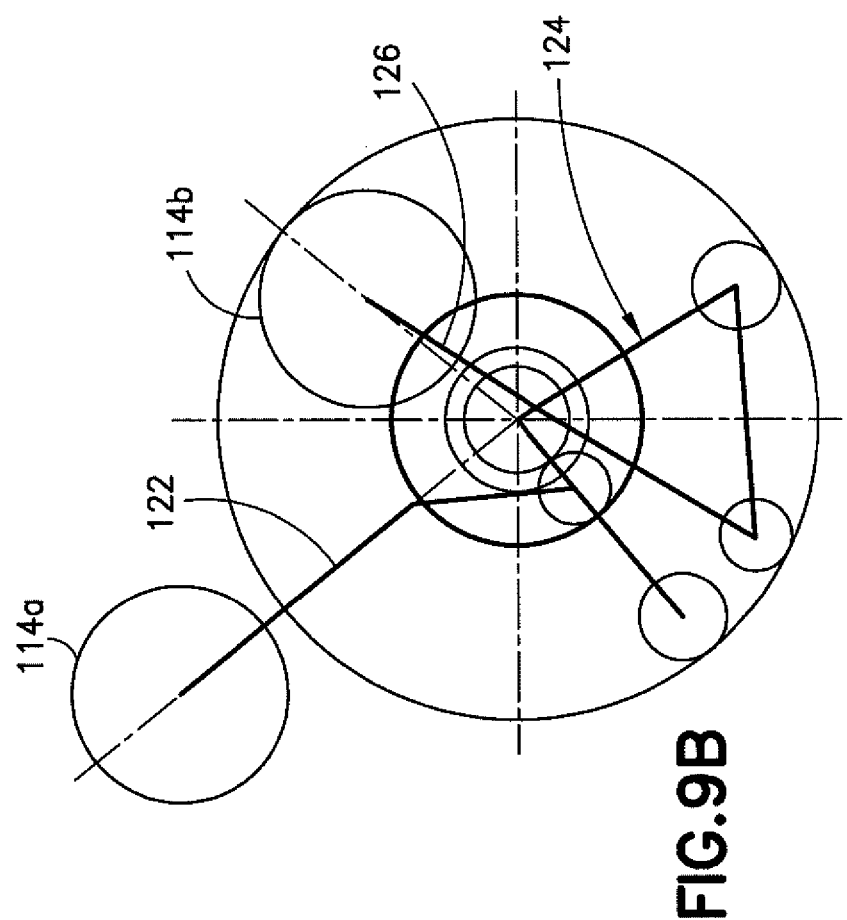
FIG.9A
FIG.9B

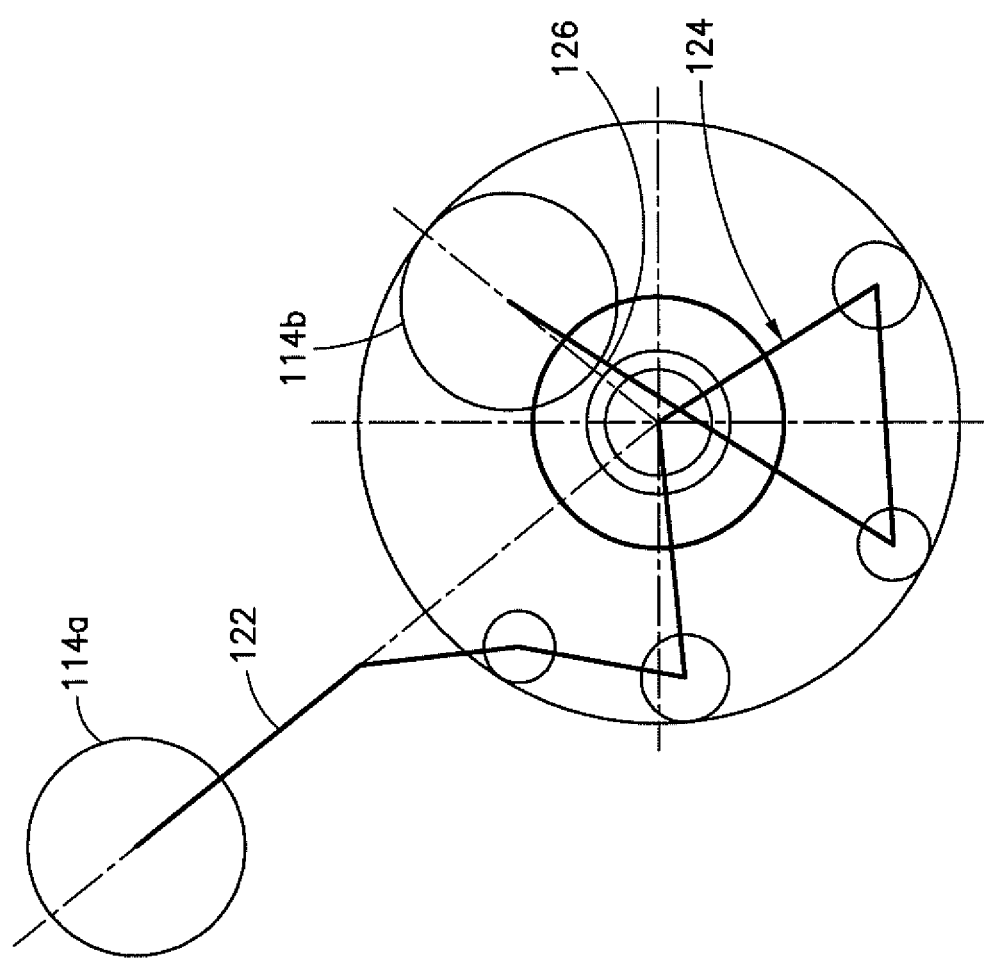

ASYMMETRIC DUAL END EFFECTOR ROBOT ARM

CROSS REFERENCE TO RELATED APPLICATION

This application claims priority under 35 USC 119(e) to U.S. Provisional Application No. 62/816,413, filed Mar. 11, 2019, which is hereby incorporated by reference in its entirety.

BACKGROUND

Technical Field

The example and non-limiting embodiments disclosed herein relate generally to a robot arm and, more particularly, to a robot having two or more arms in which end effectors on the arms are offset relative to each other.

Brief Description of Prior Developments

Processes for the manufacturing of semiconductor, LED, Solar, MEMS, or other devices utilize robotics and other forms of automation to transport substrates and carriers associated with substrates to and from storage locations, processing locations, or other locations. Such transport of substrates may include moving individual substrates, groups of substrates with single arms transporting one or more substrates, or with multiple arms, each transporting one or more substrates. Much of the manufacturing, for example, as associated with semiconductor manufacturing, is done in a vacuum environment where footprint and volume are at a premium. Furthermore, much of the automated transport is conducted to obtain the maximum efficiency of substrate movement within a workspace volume. Accordingly, there is a desire to provide substrate transport automation that utilizes minimum footprint and workspace volume for a given range of transport applications with maximized efficiency of movement.

SUMMARY

The following summary is merely intended to be exemplary. The summary is not intended to limit the scope of the claims.

In accordance with one aspect, an example apparatus comprises: a first arm comprising an unequal-link linkage having a first end effector; a second arm comprising an equal-link linkage having a second end effector; and a drive unit coupled to the first arm and the second arm, the drive unit being configured to move the first arm and the second arm. The first end effector is asymmetric to the second end effector. The first end effector is angled relative to the second end effector such that a first substrate support section on the first end effector is not positioned over or under a second substrate support section on the second end effector.

In accordance with another aspect, an example substrate transport apparatus for carrying at least two substrates comprises: a lower arm comprising two links of unequal length and a lower end effector; an upper arm comprising two links of equal length and an upper end effector; and a drive unit coupled to the lower arm and the upper arm, the drive unit being configured to rotate and extend the lower arm and the upper arm. The lower end effector is asymmetric to and angled relative to the upper end effector such that a distal end of the lower end effector is not positioned under a distal end of the upper end effector and such that upon a movement of the lower arm or the upper arm, the distal end of the lower end effector does not travel under the distal end of the upper end effector.

In accordance with another aspect, an example method of transporting a first substrate and a second substrate comprises: rotating, about a shaft of a drive unit, a first arm comprising a first linkage having a first end effector, the first end effector being configured to transport a first substrate; and extending the first linkage relative to a second arm comprising a second linkage having a second end effector, the second end effector being asymmetric to and angled relative to the first end effector, the second end effector being configured to transport a second substrate. At an at rest position, the first substrate is not positioned over or under the second substrate. Upon extending the first linkage, the first substrate does not travel over or under the second substrate.

In accordance with another aspect, an example method of assembling a substrate transport apparatus comprises: connecting an upper link of a first linkage arm to a rotatable shaft of a drive unit; connecting a lower link of the first linkage arm to the upper link of the first linkage arm at a first elbow joint; connecting a first end effector to the lower link of the first linkage arm at a first wrist joint; connecting an upper link of a second linkage arm to the rotatable shaft of the drive unit; connecting a lower link of the second linkage arm to the upper link of the second linkage arm at a second elbow joint; and connecting a second end effector to the lower link of the second linkage arm at a second wrist joint. At least the upper link of the first linkage arm and the lower link of the first linkage arm are of unequal lengths. The first end effector is angled relative to the second end effector such that a first substrate support section at a distal end of the first end effector is not over or under a second substrate support section at a distal end of the second end effector.

In accordance with another aspect, an example apparatus comprises: at least one processor; and at least one non-transitory memory including computer program code, the at least one memory and the computer program code configured to, with the at least one processor, cause the apparatus at least to perform: rotating, about a shaft of a drive unit, a first arm comprising a first linkage having a first end effector, the first end effector being configured to transport a first substrate; and extending the first linkage relative to a second arm comprising a second linkage having a second end effector, the second end effector being asymmetric to and angled relative to the first end effector, the second end effector being configured to transport a second substrate. At an at rest position, the first substrate is not positioned over or under the second substrate. Upon extending the first linkage, the first substrate does not travel over or under the second substrate.

BRIEF DESCRIPTION OF THE DRAWINGS

The foregoing aspects and other features are explained in the following description, taken in connection with the accompanying drawings, wherein:

FIG. 5A is a perspective view of the substrate transport apparatus of FIG. 3 in an at rest position;

FIGS. 5B and 5C are perspective views of the apparatus of FIG. 5A showing extensions of an unequal-link linkage of the apparatus;

FIG. 6A is a perspective view of the substrate transport apparatus of FIG. 3 in an at rest position;

FIGS. 6B and 6C are perspective views of the apparatus of FIG. 6A showing extensions of an equal-link linkage of the apparatus;

FIGS. 8A-8C are schematic views of an extension of a non-skewed end effector of a transport apparatus from a retracted position to an extended position; and FIGS. 9A-9C are schematic views of an extension of a skewed end effector of the transport apparatus of FIGS. 8A-8C from a retracted position to an extended position.

DETAILED DESCRIPTION OF EMBODIMENTS

Figure 1A:
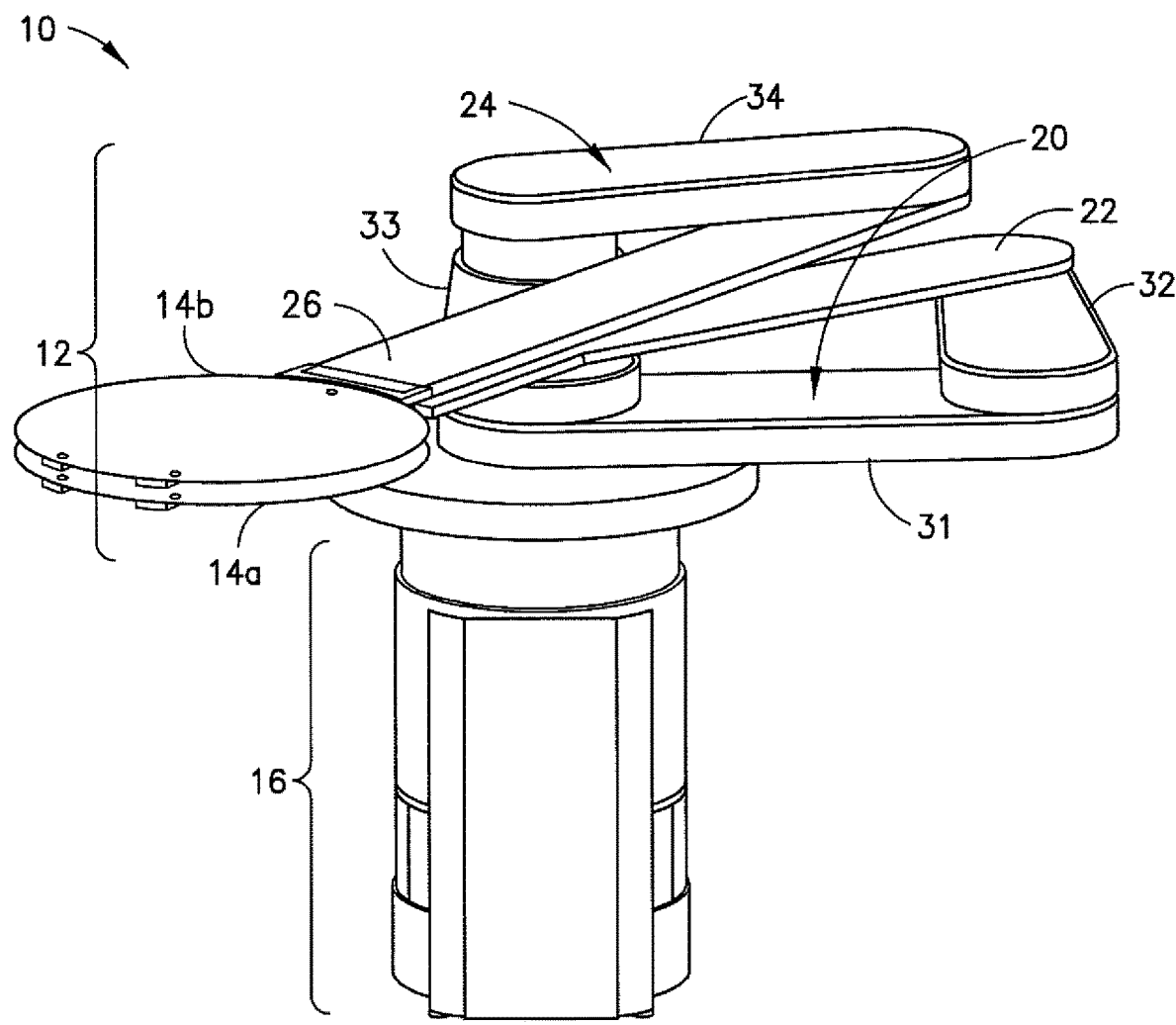
FIG. 1A is a perspective view of a robot for moving substrates, the robot having an equal-link linkage arm and an unequal-link linkage arm and in which end effectors on the arms are arranged in a stacked configuration.
Figure 1B:
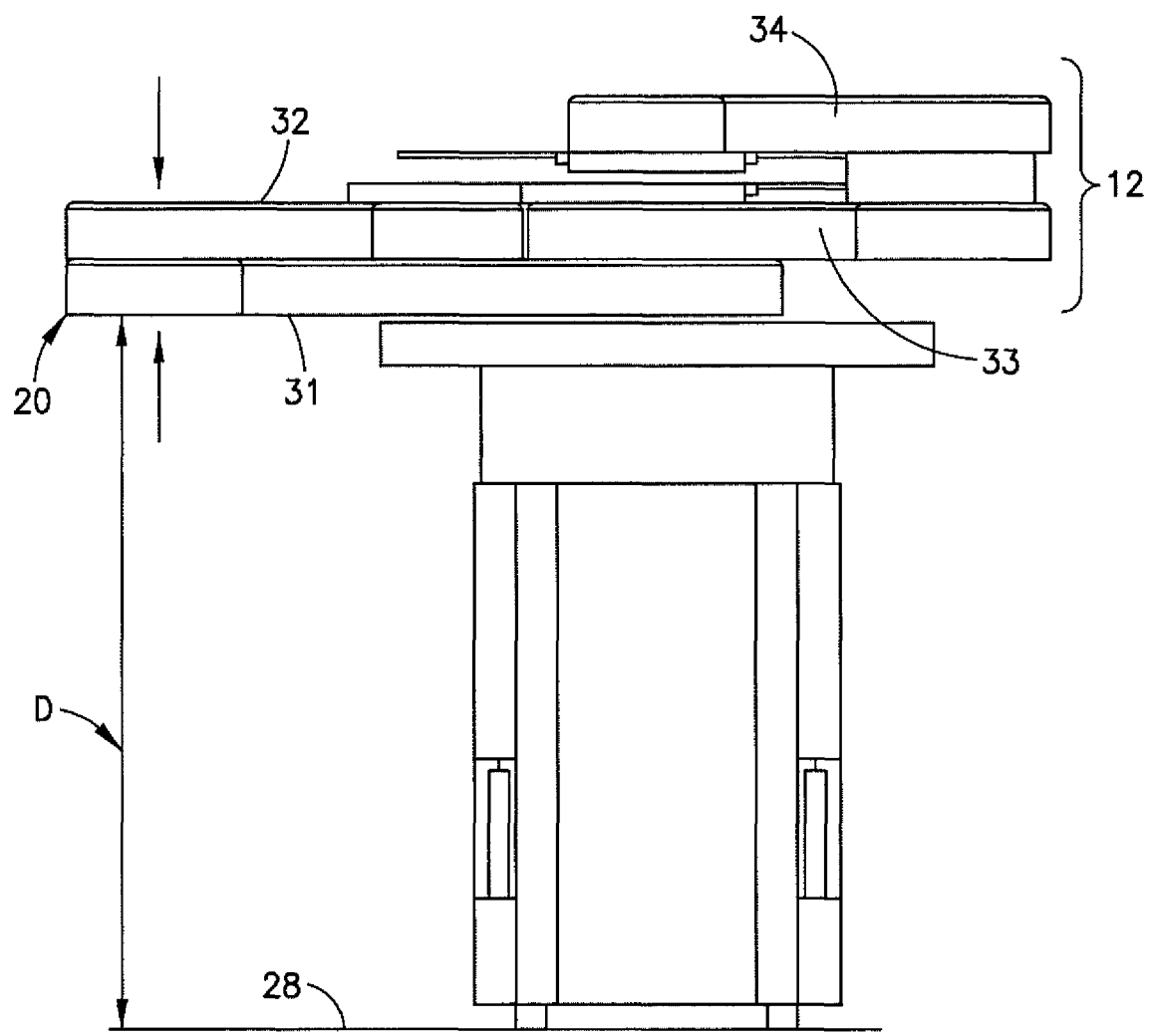
FIG. 1B is side view of the robot of FIG. 1A.

Referring to FIGS. 1A and 1B, an apparatus for substrate transport may comprise a robot as shown generally at 10. Robot 10 comprises a substrate transport apparatus (hereinafter "transport apparatus 12") configured to transport substrates 14a, 14b between and among, for example, substrate processing chambers and load locks. Robot 10 also comprises a drive unit 16 (which may include, for example, one or more motors or any other suitable driving means) configured to drive arms and multiple effectors of the transport apparatus 12, thereby causing transport of the substrates. By way of example, robots having multiple end effectors are described in U.S. patent application Ser. No. 15/897,374, filed on Feb. 15, 2018, and entitled "Material-Handling Robot With Multiple End-Effectors," which is hereby incorporated by reference in its entirety.

The transport apparatus 12 comprises a plurality of arms with each arm being made extendable and rotatable via the drive unit 16. In one example embodiment, the plurality of arms comprises at least one unequal-link linkage 20 drivable with non-circular pulleys. The unequal-link linkage 20 has an upper arm 31 and a lower arm 32, the upper arm 31 being connected to the drive unit 16 at a shoulder and the lower arm 32 being connected to the upper arm 31 at an elbow. A first end effector 22 is connected to the lower arm 32 at a wrist, the first end effector 22 having leg section and a substrate support section at a distal end of the leg section to support a lower substrate 14a. The plurality of arms also comprises at least one equal-link linkage 24 having an upper arm 33 and a lower arm 34, the upper arm 33 being connected to the drive unit at a shoulder and the lower arm 34 being connected to the upper arm 33 at an elbow. A second end effector 26 is connected to the lower arm 34 at a wrist, the second end effector 26 having a leg section and a substrate support section at a distal end of the leg section to support an upper substrate 14b.

The first end effector 22 and the second end effector 26 are asymmetric. As shown, the leg section of the first end effector 22 is bent or otherwise angled, or curved, whereas the leg section of the second end effector 26 is straight. However, in some example embodiments, both the leg section of the first end effector 22 and the leg section of the second end effector 26 may be bent. The leg section of each end effector 22, 26 connects the substrate support section to a wrist joint of the end effector with regard to the corresponding linkage 22, 24, where the leg has a first section connected to the wrist joint and a second section connected to the substrate support section. In the first end effector 22 in which the leg is bent, the first and second sections are connected to each other at an angle of between about 90 degrees and about 120 degrees. By way of example, robots having arms in which the legs of the end effectors are bent or are otherwise angled are described in U.S. Pat. No. 9,149,936 issued on Oct. 6, 2015, and entitled "Robot Having Arm With Unequal Link Lengths," which is hereby incorporated by reference in its entirety.

As shown in FIG. 1B, the unequal-link linkage 20 is located at a distance D or greater from a floor surface 28. The configuration of the transport apparatus 12 provides a maximum radial reach from a given containment diameter. By way of example, robots having arms with unequal link lengths are described in U.S. Pat. No. 9,149,936 issued on Oct. 6, 2015, and entitled "Robot Having Arm With Unequal Link Lengths," which is hereby incorporated by reference in its entirety.

Figure 1D:
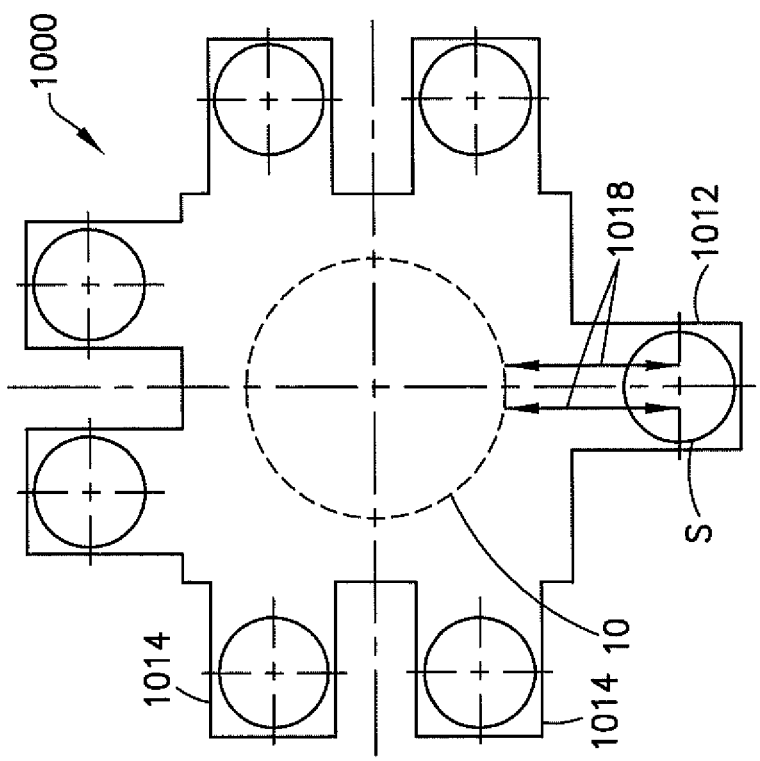
FIGS. 1C and 1D illustrate examples of substrate movements in a substrate processing system comprising features as described herein.
Figure 1C:
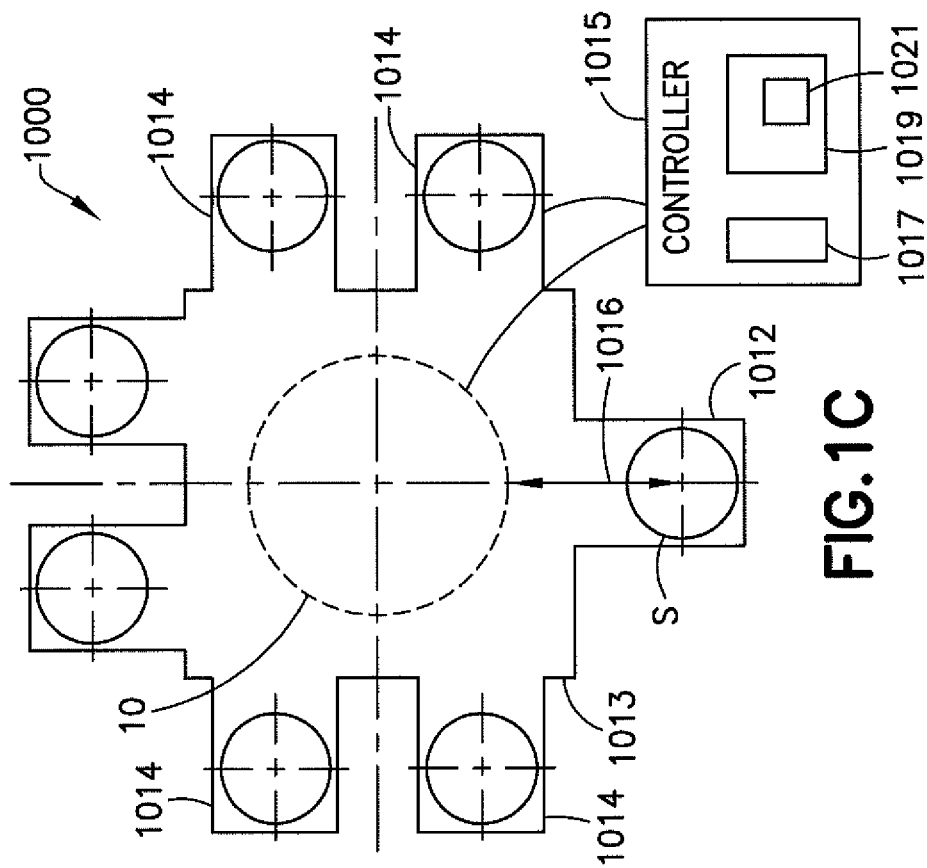

Referring to FIGS. 1C and 1D, an example substrate processing system or semiconductor wafer processing system is shown generally at 1000 and is hereinafter referred to as "system 1000." System 1000 may comprise, for example, one or more radial stations 1012 and one or more offset stations 1014. The robot 10 may be provided to move one or more substrates S between or among the stations 1012, 1014 or other modules/stations (not shown) connected to an environment chamber 1013. The environment chamber 1013 may provide a vacuum environment for example, and has the robot 10 extending through a bottom wall of the chamber 1013 into the environment defined, at least partially, by the chamber 1013. The robot 10 and stations 1012, 1014 are connected to at least one controller 1015 comprising at least one processor 1017 and at least one memory 1019 comprising software 1021 to control operations of the system 1000. The system 1000 may provide, for example, the following wafer-handling operations: (a) Pick/place 1016 a single wafer or substrate S from/to a single radial station 1012, as illustrated diagrammatically in FIG. 1C; (b) Pick/place 1018 simultaneously a pair of wafers or substrates S from/to a pair of stacked radial stations 1012, as is illustrated diagrammatically in FIG. 1D. Other operations involving the offset stations 1014 are possible.

Figure 2A:
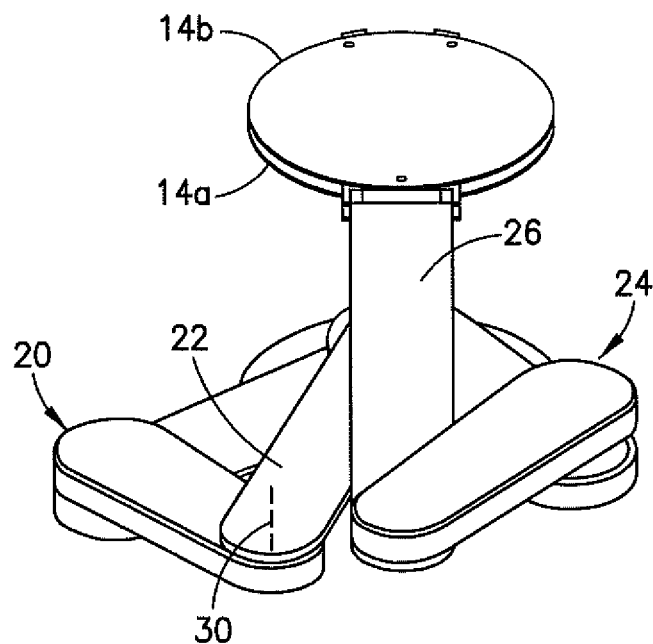
FIG. 2A is a perspective view of a substrate transport apparatus of the robot of FIGS. 1A and 1B showing the end effectors stacked and in an at rest position.
Figure 2B:
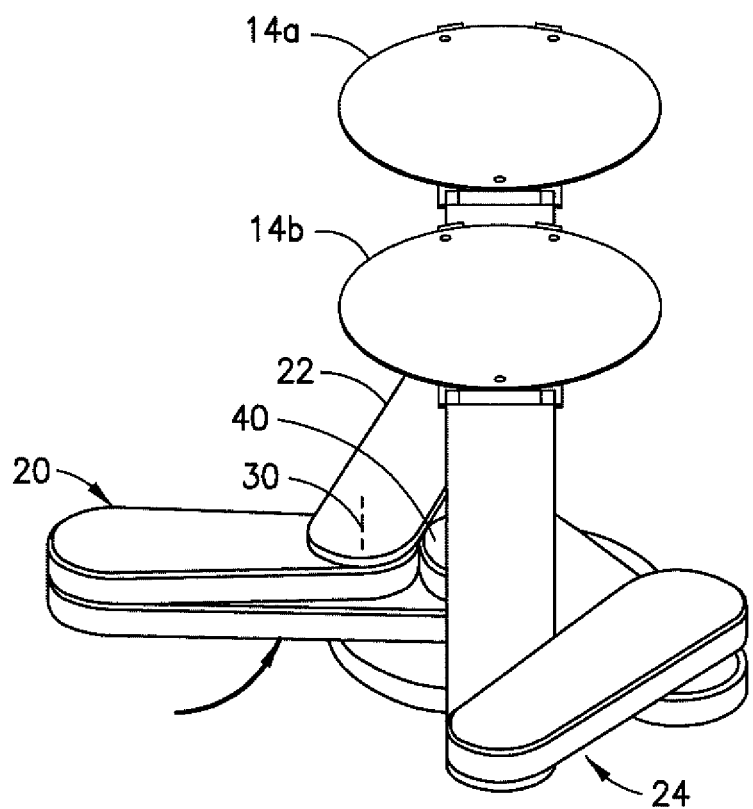
FIGS. 2B and 2C are perspective views of the substrate transport apparatus of the robot of FIG. 2A showing one end effector moving relative to another end effector.
Figure 2C:
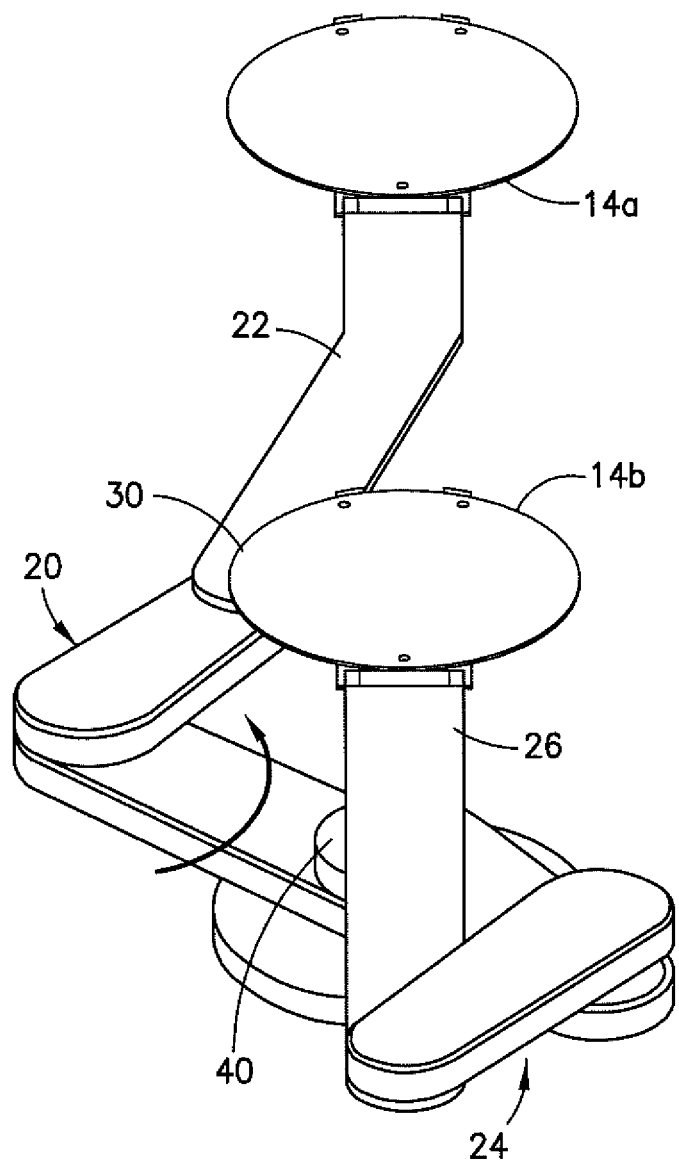

Referring to FIGS. 2A-2C, an initial position of the transport apparatus 12 is a configuration in which a portion of the second end effector 26 is positioned over a portion of the first end effector 22 (FIG. 2A) such that the upper substrate 14b is positioned over the lower substrate 14a in a stacked configuration. Upon extension of the first end effector 22 supporting the lower substrate 14a (FIG. 2B), a wrist 30 on the unequal-link linkage 20 (the lower arm) passes a shoulder 40 on the equal-link linkage 24 (the upper arm). A similar movement happens during retraction of the same end effector. Upon full extension of the first end effector 22 supporting the lower substrate 14a and without movement of the equal-link linkage 24 (FIG. 2C), the length of the equal-link linkage 24 travel allows for containment of the wrist and maximum travel.

Figure 3:
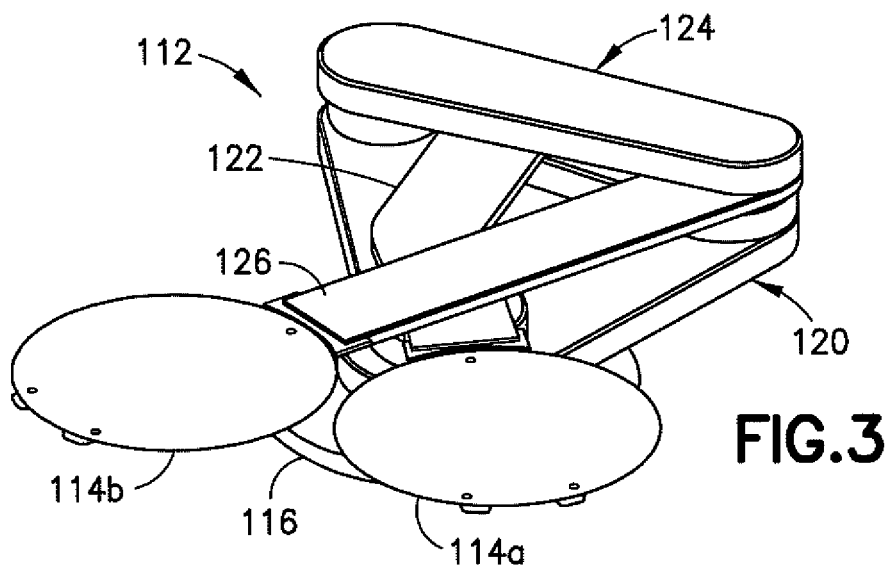
FIG. 3 is a perspective view of a substrate transport apparatus in which the end effectors are not stacked.

Referring to FIG. 3, a substrate transport apparatus for substrate processing and having end effectors where at least one end effector is angled or bent such that substrate support sections on the end effectors are offset from each other or skewed relative to each other in an at rest position is shown generally at 112 and is hereinafter referred to as "transport apparatus 112." In one example embodiment, transport apparatus 112 comprises a lower arm comprising an unequal-link linkage 120 and a first end effector 122 and an upper arm comprising an equal-link linkage 124 and a second end effector 126, the arms being extendable and rotatable by, for example, a drive unit 116 (motor or motors). The first end effector 122 is asymmetric to the second end effector 126 but is also angled or bent or curved relative to the second end effector 126 such that the substrate support sections are offset from each other or skewed (not stacked) relative to each other in an at rest position. As above, a leg section of each end effector 122, 126 connects the substrate support section to a wrist joint, where the leg has a first section connected to the wrist joint and a second section connected to the substrate support section. Where the end effector is angled or bent, the first and second sections of the leg are connected to each other at an angle of between about 90 degrees and about 120 degrees. As shown herein, the first end effector 122 is angled relative to the second end effector 126 such that during an initial at rest position, an upper substrate 114b supported on the substrate support section of the equal-link linkage 124 of the upper arm is not positioned over a lower substrate 114a supported on the substrate support section of the unequal-link linkage 120. Also, during movement of either or both the lower arm defined by the unequal-link linkage 120 and the upper arm defined by the equal-link linkage 124, the upper substrate 114b does not travel over the lower substrate 114a. The transport apparatus 112 or a robot incorporating transport apparatus 112 may, similar to robot 10, be connected to at least one controller comprising at least one processor and at least one memory comprising software to control operations of a system.

Figure 4:
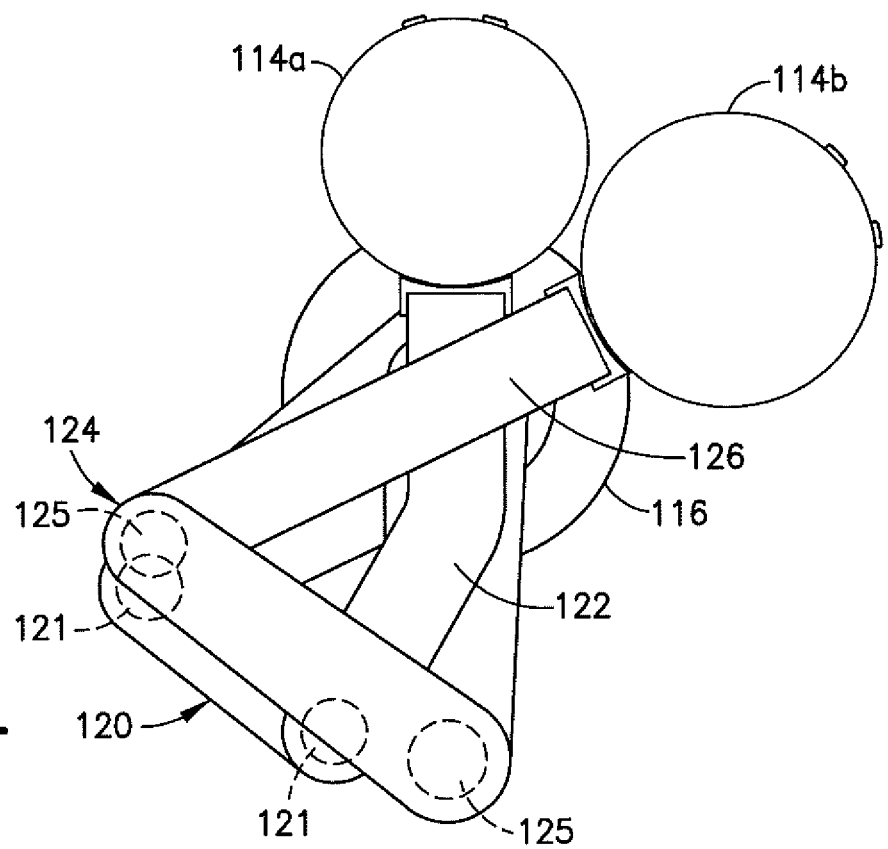
FIG. 4 is a top view of the substrate transport apparatus of FIG. 3.

Referring to FIG. 4, the linkages are rotated about a shaft of the drive unit 116 to move a wafer (substrate 114b) on the second end effector 126 away from a wafer (substrate 114a) on the first end effector 122. The portions of the equal-link linkage 124 are articulated to move an elbow of the equal-link linkage 124 away from a wrist of the unequal-link linkage 120. Linkages of the unequal-link linkage 120 may be extended or otherwise moved with one or more pulleys 121 located at joints of the unequal-link linkage 120 such as the wrist, elbow, and/or a shoulder connection of the unequal-link linkage 120 to the drive unit 116, the pulleys being circular or non-circular. In some example embodiments, the linkages of the equal-link linkage 124 may be similarly moved with pulleys 125 that are circular or non-circular.

Referring to FIG. 5A, at an at rest position, the configuration of the asymmetric end effectors 122, 126 with the offset or skewed substrate support sections causes the wafer (substrate 114b) carried on the second end effector 126 to not be over the wafer (substrate 114a) on the first end effector 122.

Referring to FIG. 5B, as the unequal-link linkage 120 is rotated by the drive unit 116, the unequal-link linkage 120 is extended, and the first end effector 122 moves away from the second end effector 126.

Figure 5C:
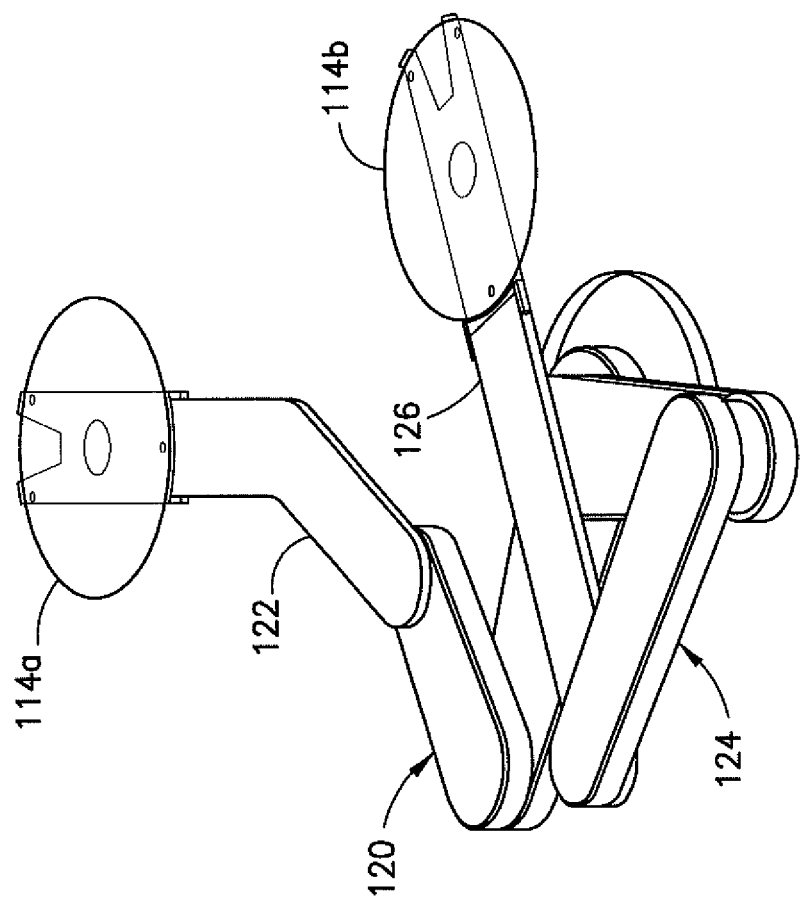

Referring to FIG. 5C, as the unequal-link linkage 120 is further extended, the first end effector 122 moves farther away from the second end effector 126.

Referring to FIG. 6A, at the at rest position, the configuration of the asymmetric end effectors with the offset or skewed substrate support sections causes the wafer (substrate 114b) carried on the second end effector 126 to not be over the wafer (substrate 114a) on the first end effector 122 (see also FIG. 5A).

Referring to FIG. 6B, as the equal-link linkage 124 is rotated by the drive unit 116, the equal-link linkage 120 is extended, and the second end effector 126 moves away from the first end effector 122.

Figure 6C:
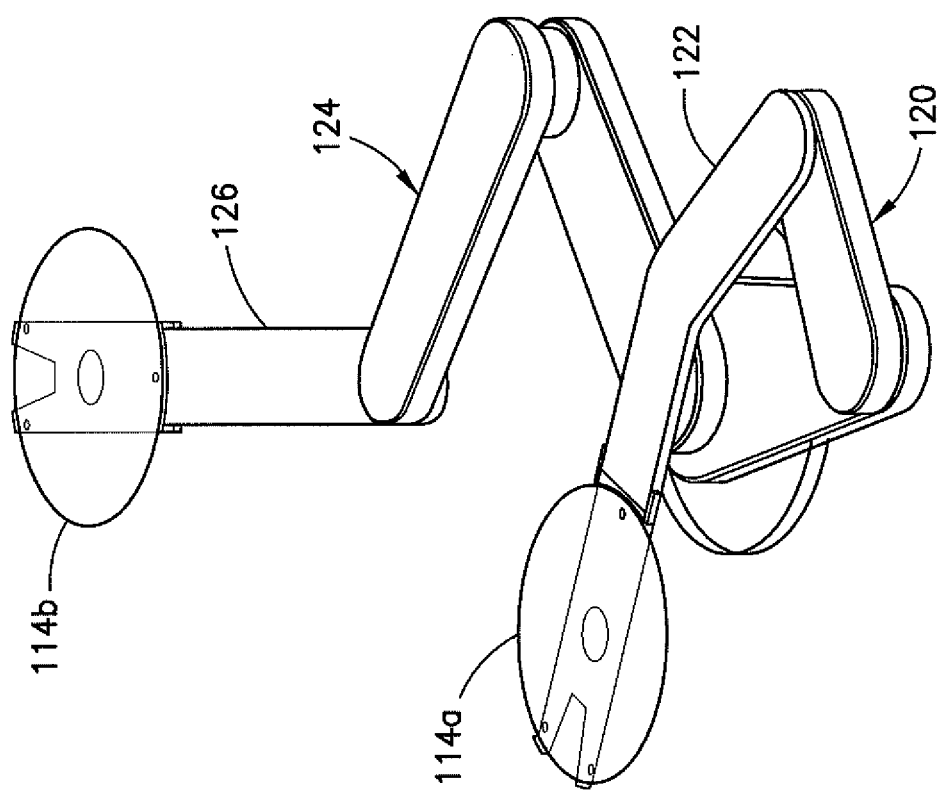

Referring to FIG. 6C, as the equal-link linkage 124 is further extended, the second end effector 126 moves even farther away from the first end effector 122.

Figure 7:
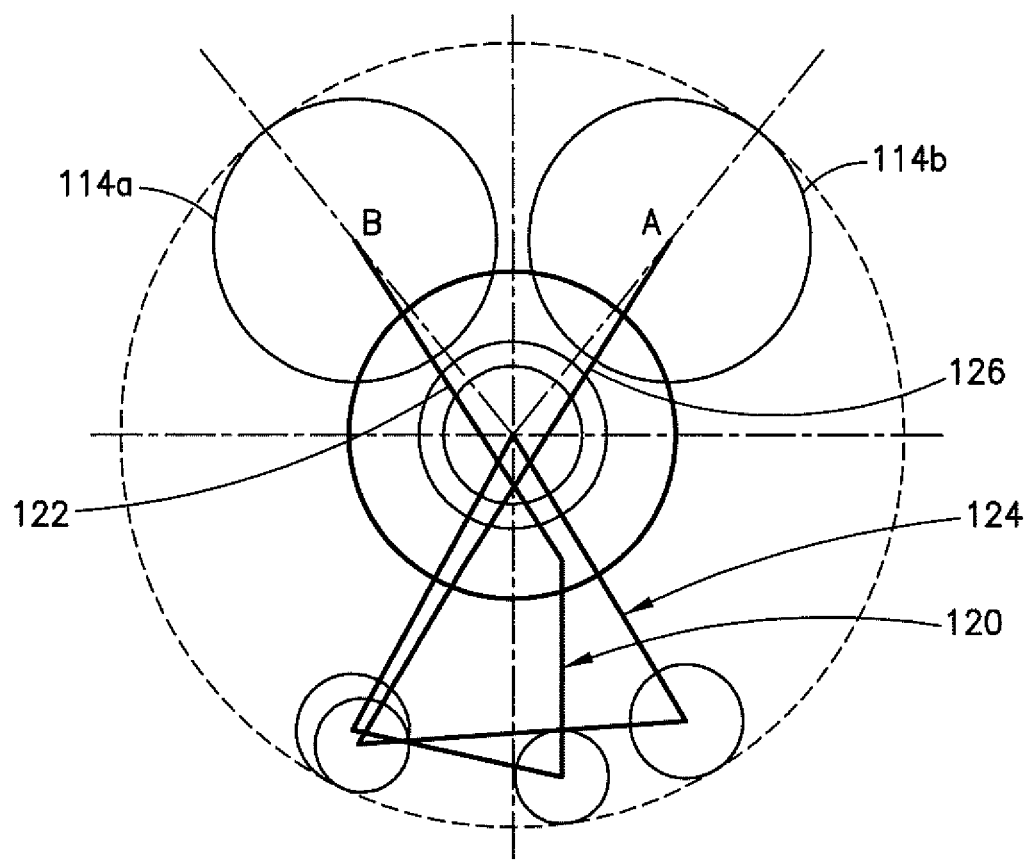
FIG. 7 is a schematic view of a transport apparatus having asymmetric dual arms and using non-circular pulleys and being in a retracted position.

Referring to FIG. 7, the unequal-link linkage 120 and the equal-link linkage 124 may be moved with circular or non-circular pulleys. The end effectors 122, 126 are rotated from radial orientations to achieve additional clearance between each end effector 122, 126 and between at least the elbows of each linkage 120, 124.

Referring to FIGS. 8A-8C, for the extension of the equal-link linkage 124, in an initial phase (FIG. 8A, a retracted position), the substrate 114b is not positioned over the substrate 114a.

As shown in FIG. 8B, in a link-over-link position, an orientation of the end effectors 122, 126 changes as the end effector 126 moves along a straight line 127. More specifically, when a wrist of the equal-link linkage 124 is positioned directly over the point at which the equal-link linkage 124 is connected to the drive unit 116 (a shoulder), an orientation of the end effectors 122, 126 changes as a center of the substrate 114b moves along the straight line 127.

As shown in FIG. 8C, in a final phase in which the end effector 126 (and therefore the substrate 114b) is in an extended position, the orientation of the end effectors 122, 126 is constant, and the center of the substrate 114b continues to move along the straight line 127.

Referring to FIGS. 9A-9C, for the extension of the unequal-link linkage 120, in an initial phase (FIG. 9A, a retracted position), again the substrate 114b is not positioned over the substrate 114a. As shown in FIG. 9B, in a link-over-link position, an orientation of the end effectors 122, 126 changes as a center of the substrate 114a moves along a straight line. As shown in FIG. 9C, in a final phase in which the substrate 114a is in an extended position, the orientation of the end effectors 122, 126 is constant, and the center of the substrate 114a continues to move along the straight line.

In any embodiment, the upper arms (for example, upper arm 31 and upper arm 33) of the robot arms described herein may be attached directly to a first shaft of the drive unit. The lower arms (for example, lower arm 32 and lower arm 34) may be coupled to the corresponding upper arms via a rotary elbow joint and actuated by a second shaft of the drive unit, the second shaft being located coaxially with the first shaft, using a belt arrangement. The belt arrangement may comprise a shoulder pulley, which may be attached to a third shaft of the drive unit, an elbow pulley, which may be attached to the upper arm, and a band, belt, or cable (or any other suitable means), which may transmit motion between the two pulleys. The belt arrangement may feature a constant or variable transmission ratio. As an example, the variable transmission ratio may be selected so that the orientation of the upper arms with the end effectors changes in a predefined manner as a function of the relative position of the upper arms and a driving shaft of the drive unit. However, any other suitable arrangement may be used.

In one example embodiment, an apparatus comprises: a first arm comprising an unequal-link linkage having a first end effector; a second arm comprising an equal-link linkage having a second end effector; and a drive unit coupled to the first arm and the second arm, the drive unit being configured to move the first arm and the second arm. The first end effector is asymmetric to the second end effector. The first end effector is angled relative to the second end effector such that a first substrate support section on the first end effector is not positioned over or under a second substrate support section on the second end effector.

Upon a movement of the first arm or the second arm, one of the first substrate support section on the first end effector or the second substrate support section on the second end effector may not travel over or under the other of the first substrate support section on the first end effector or the second substrate support section on the second end effector. Linkages of one or both of the equal-link linkage and the unequal-link linkage may be moved with at least one non-circular pulley. The first arm and the second arm may be configured such that upon an extension movement of the first arm, the first end effector moves away from the second end effector. The first arm and the second arm may be configured such that upon an extension movement of the second arm, the second end effector moves away from the first end effector. In a link-over-link position of the equal-link linkage, an orientation of the first end effector and the second end effector may change as the second end effector moves along a straight line. When the second end effector is in an extended position, the orientation of the first end effector and the second end effector may be constant and the second end effector may continue to move along the straight line. In a link-over-link position of the unequal-link linkage, an orientation of the first end effector and the second end effector may change as the first end effector moves along a straight line. When the first end effector is in an extended position, the orientation of the first end effector and the second end effector may be constant and the first end effector may continue to move along the straight line.

In another example embodiment, a substrate transport apparatus for carrying at least two substrates comprises: a lower arm comprising two links of unequal length and a lower end effector; an upper arm comprising two links of equal length and an upper end effector; and a drive unit coupled to the lower arm and the upper arm, the drive unit being configured to rotate and extend the lower arm and the upper arm. The lower end effector is asymmetric to and angled relative to the upper end effector such that a distal end of the lower end effector is not positioned under a distal end of the upper end effector and such that upon a movement of the lower arm or the upper arm, the distal end of the lower end effector does not travel under the distal end of the upper end effector.

The substrate transport apparatus may further comprise pulleys located at joints of the links of the lower arm and at joints of the links of the upper arm, the pulleys of each arm being operably coupled to the drive unit and to other pulleys of the same arm such that operation of the drive unit causes the movement of the lower arm and/or the movement of the upper arm. At least one of the pulleys may be a non-circular pulley. The lower arm and the upper arm may be each configured such that upon an extension movement of the lower arm, the lower end effector moves away from the upper end effector, and such that upon an extension movement of the upper arm, the upper end effector moves away from the lower end effector. In a link-over-link position of the upper arm, an orientation of the upper end effector and the lower end effector may change as the lower end effector moves along a straight line, and in a link-over-link position of the lower arm, an orientation of the lower end effector and the upper end effector may change as the upper end effector moves along a straight line.

In another example embodiment, a method of transporting a first substrate and a second substrate comprises: rotating, about a shaft of a drive unit, a first arm comprising a first linkage having a first end effector, the first end effector being configured to support and transport the first substrate; and extending the first linkage relative to a second arm comprising a second linkage having a second end effector, the second end effector being asymmetric to and angled relative to the first end effector, the second end effector being configured to support and transport the second substrate. At an at rest position, the first substrate is not positioned over or under the second substrate. Upon extending the first linkage, the first substrate does not travel over or under the second substrate.

The first linkage may be extended using at least one non-circular pulley. The first arm and the second arm may be configured such that upon extending the first linkage, the first end effector moves away from the second end effector. In a link-over-link position of the first linkage, an orientation of the first end effector and the second end effector may change as the first end effector moves along a straight line. When the first end effector is moving to an extended position, the orientation of the first end effector and the second end effector may be constant and the first end effector may continue to move along the straight line.

In another example embodiment, A method of assembling a substrate transport apparatus comprises: connecting an upper link of a first linkage arm to a rotatable shaft of a drive unit; connecting a lower link of the first linkage arm to the upper link of the first linkage arm at a first elbow joint; connecting a first end effector to the lower link of the first linkage arm at a first wrist joint; connecting an upper link of a second linkage arm to the rotatable shaft of the drive unit; connecting a lower link of the second linkage arm to the upper link of the second linkage arm at a second elbow joint; and connecting a second end effector to the lower link of the second linkage arm at a second wrist joint. At least the upper link of the first linkage arm and the lower link of the first linkage arm are of unequal lengths. The first end effector is angled relative to the second end effector such that a first substrate support section at a distal end of the first end effector is not over or under a second substrate support section at a distal end of the second end effector.

In another example embodiment, an apparatus comprises: at least one processor; and at least one non-transitory memory including computer program code, the at least one memory and the computer program code configured to, with the at least one processor, cause the apparatus at least to perform: rotating, about a shaft of a drive unit, a first arm comprising a first linkage having a first end effector, the first end effector being configured to support and transport a first substrate; and extending the first linkage relative to a second arm comprising a second linkage having a second end effector, the second end effector being asymmetric to and angled relative to the first end effector, the second end effector being configured to support and transport a second substrate. At an at rest position, the first substrate is not positioned over or under the second substrate. Upon extending the first linkage, the first substrate does not travel over or under the second substrate.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances.

What is claimed is:

1. An apparatus, comprising:
a first arm comprising an unequal-link linkage having a first end effector;
a second arm comprising an equal-link linkage having a second end effector; and
a drive unit coupled to the first arm and the second arm, the drive unit being configured to move the first arm and the second arm;
wherein the first end effector is asymmetric to the second end effector; and
wherein the first end effector is angled relative to the second end effector such that a first substrate support section on the first end effector is not positioned over or under a second substrate support section on the second end effector.

2. The apparatus of claim 1, wherein upon a movement of the first arm or the second arm, one of the first substrate support section on the first end effector or the second substrate support section on the second end effector does not travel over or under the other of the first substrate support section on the first end effector or the second substrate support section on the second end effector.

3. The apparatus of claim 1, wherein linkages of one or both of the equal-link linkage and the unequal-link linkage are moved with at least one non-circular pulley.

4. The apparatus of claim 1, wherein the first arm and the second arm are configured such that upon an extension movement of the first arm, the first end effector moves away from the second end effector.

5. The apparatus of claim 1, wherein the first arm and the second arm are configured such that upon an extension movement of the second arm, the second end effector moves away from the first end effector.

6. The apparatus of claim 1, wherein in a link-over-link position of the equal-link linkage, an orientation of the first end effector and the second end effector changes as the second end effector moves along a straight line.

7. The apparatus of claim 6, wherein when the second end effector is in an extended position, the orientation of the first end effector and the second end effector is constant and the second end effector continues to move along the straight line.

8. The apparatus of claim 1, wherein in a link-over-link position of the unequal-link linkage, an orientation of the first end effector and the second end effector changes as the first end effector moves along a straight line.

9. The apparatus of claim 8, wherein when the first end effector is in an extended position, the orientation of the first end effector and the second end effector is constant and the first end effector continues to move along the straight line.

10. A substrate transport apparatus for carrying at least two substrates, the substrate transport apparatus comprising:
a lower arm comprising two links of unequal length and a lower end effector;
an upper arm comprising two links of equal length and an upper end effector; and
a drive unit coupled to the lower arm and the upper arm, the drive unit being configured to rotate and extend the lower arm and the upper arm;
wherein the lower end effector is asymmetric to and angled relative to the upper end effector such that a distal end of the lower end effector is not positioned under a distal end of the upper end effector and wherein upon a movement of the lower arm or the upper arm, the distal end of the lower end effector does not travel under the distal end of the upper end effector.

11. The substrate transport apparatus of claim 10, further comprising pulleys located at joints of the links of the lower arm and at joints of the links of the upper arm, the pulleys of each arm being operably coupled to the drive unit and to other pulleys of the same arm such that operation of the drive unit causes the movement of the lower arm and/or the movement of the upper arm.

12. The substrate transport apparatus of claim 11, wherein at least one of the pulleys is a non-circular pulley.

13. The substrate transport apparatus of claim 10, wherein the lower arm and the upper arm are each configured such that upon an extension movement of the lower arm, the lower end effector moves away from the upper end effector, and such that upon an extension movement of the upper arm, the upper end effector moves away from the lower end effector.

14. The substrate transport apparatus of claim 10,
wherein in a link-over-link position of the upper arm, an orientation of the upper end effector and the lower end effector changes as the lower end effector moves along a straight line, and
wherein in a link-over-link position of the lower arm, an orientation of the lower end effector and the upper end effector changes as the upper end effector moves along a straight line.

15. A method of transporting a first substrate and a second substrate, the method comprising:
rotating, about a shaft of a drive unit, a first arm comprising a first linkage having a first end effector, the first end effector being configured to transport the first substrate; and
extending the first linkage relative to a second arm comprising a second linkage having a second end effector, the second end effector being asymmetric to and angled relative to the first end effector, the second end effector being configured to transport the second substrate;
wherein at an at rest position, the first substrate is not positioned over or under the second substrate; and
wherein upon extending the first linkage, the first substrate does not travel over or under the second substrate.

16. The method of claim 15, wherein the first linkage is extended using at least one non-circular pulley.

17. The method of claim 15, wherein the first arm and the second arm are configured such that upon extending the first linkage, the first end effector moves away from the second end effector.

18. The method of claim 15, wherein in a link-over-link position of the first linkage, an orientation of the first end effector and the second end effector changes as the first end effector moves along a straight line.

19. The method of claim 18, wherein when the first end effector is moving to an extended position, the orientation of the first end effector and the second end effector is constant and the first end effector continues to move along the straight line.

20. A method of assembling a substrate transport apparatus, the method comprising:
- connecting an upper link of a first linkage arm to a rotatable shaft of a drive unit;
- connecting a lower link of the first linkage arm to the upper link of the first linkage arm at a first elbow joint;
- connecting a first end effector to the lower link of the first linkage arm at a first wrist joint;
- connecting an upper link of a second linkage arm to the rotatable shaft of the drive unit;
- connecting a lower link of the second linkage arm to the upper link of the second linkage arm at a second elbow joint; and
- connecting a second end effector to the lower link of the second linkage arm at a second wrist joint;
- wherein at least the upper link of the first linkage arm and the lower link of the first linkage arm are of unequal lengths; and
- wherein the first end effector is angled relative to the second end effector such that a first substrate support section at a distal end of the first end effector is not over or under a second substrate support section at a distal end of the second end effector.

21. An apparatus, comprising:
- at least one processor; and
- at least one non-transitory memory including computer program code, the at least one memory and the computer program code configured to, with the at least one processor, cause the apparatus at least to perform:
- rotating, about a shaft of a drive unit, a first arm comprising a first linkage having a first end effector, the first end effector being configured to transport a first substrate; and
- extending the first linkage relative to a second arm comprising a second linkage having a second end effector, the second end effector being asymmetric to and angled relative to the first end effector, the second end effector being configured to transport a second substrate;
- wherein at an at rest position, the first substrate is not positioned over or under the second substrate; and
- wherein upon extending the first linkage, the first substrate does not travel over or under the second substrate.

* * * * *